United States Patent
Lin et al.

(10) Patent No.: US 7,796,875 B2
(45) Date of Patent: Sep. 14, 2010

(54) FOCUSING SYSTEM AND METHOD FOR ENHANCING RESOLUTION OF AN OPTICAL SYSTEM

(75) Inventors: Wen-Hwa Lin, Taipei Hsien (TW); Ching-Liang Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 194 days.

(21) Appl. No.: 12/171,257

(22) Filed: Jul. 10, 2008

(65) Prior Publication Data
US 2009/0142046 A1    Jun. 4, 2009

(30) Foreign Application Priority Data
Dec. 4, 2007    (CN) .................. 2007 1 0202836

(51) Int. Cl.
| G03B 3/10 | (2006.01) |
| G03B 13/34 | (2006.01) |
| G03B 15/16 | (2006.01) |
| H04N 3/14 | (2006.01) |
| H04N 5/335 | (2006.01) |
| G02B 15/14 | (2006.01) |

(52) U.S. Cl. ..................... 396/95; 396/80; 396/133; 348/294; 348/345; 348/352; 359/698

(58) Field of Classification Search .................. 396/95, 396/79, 80, 81, 82, 89, 93, 102, 133; 348/272, 348/294, 345, 352; 359/693, 698
See application file for complete search history.

(56) References Cited

U.S. PATENT DOCUMENTS

2004/0165090 A1 * 8/2004 Ning ........................ 348/272
2006/0147192 A1   7/2006 Zhang et al.

* cited by examiner

*Primary Examiner*—Rochelle-Ann J Blackman
(74) *Attorney, Agent, or Firm*—Zhigang Ma

(57) ABSTRACT

An exemplary focusing method for enhancing resolution of an optical system is provided. The method includes: focusing on an object and obtaining an image of the object by a lens assembly of the optical system, using a designated point within a motion range of an auto focusing (AF) lens in the lens assembly to calculate; determine a first coordinate and a second coordinate of the AF lens according to resolution of the image; obtaining a direction and distance for positioning the AF lens according to the two coordinates, driving the AF lens to move along the direction of motion, and limiting the range of motion of the AF lens to obtain an optimum focusing location to focus on the object according to the motion distance. A related system is also provided.

11 Claims, 6 Drawing Sheets

FOCUSING SYSTEM AND METHOD FOR ENHANCING RESOLUTION OF AN OPTICAL SYSTEM

BACKGROUND

1. Technical Field

The present invention relates to focusing systems and methods, and more particularly, to a focusing system and method for enhancing resolution of an optical system.

2. Description of the Related Art

Within the image capturing area, there has been an increasing demand for using movable optical lens systems in order to enhance image quality. However, conventional movable optical lens systems suffer from inherent disadvantages, e.g. difficulty of achieving in-focus position. For example, the resolution rendered by a movable optical lens can be less than optimal, unless the optical lens is properly focused. Actually, high quality image is hard to be took by using a conventional moveable optional lens system because an in-focus position of the lens is hard to be ascertained.

What is needed, therefore, is a focusing system and method for enhancing resolution of an optical system, which can limit the range of motion of the lens in the optical system, obtain a suitable in-focus position, and enhance the resolution of the optical system for capturing a high quality image of the object.

SUMMARY

A focusing method for enhancing resolution of an optical system includes: focusing on an object and obtaining an image of the object by a lens assembly of the optical system; using a designated point within a motion range of an auto focusing (AF) lens in the lens assembly to calculate and determine a first coordinate and a second coordinate of the AF lens according to resolution of the image; obtaining a direction and distance for positioning the AF lens according to the two coordinates; driving the AF lens to move along the direction of motion; and limiting the range of motion of the AF lens to obtain an optimum focusing location to focus on the object according to the motion distance.

Other novel features of the indicated invention will become more apparent from the following detailed description of the exemplary embodiment when taken in conjunction with the accompanying drawings.

DETAILED DESCRIPTION

Figure 1:
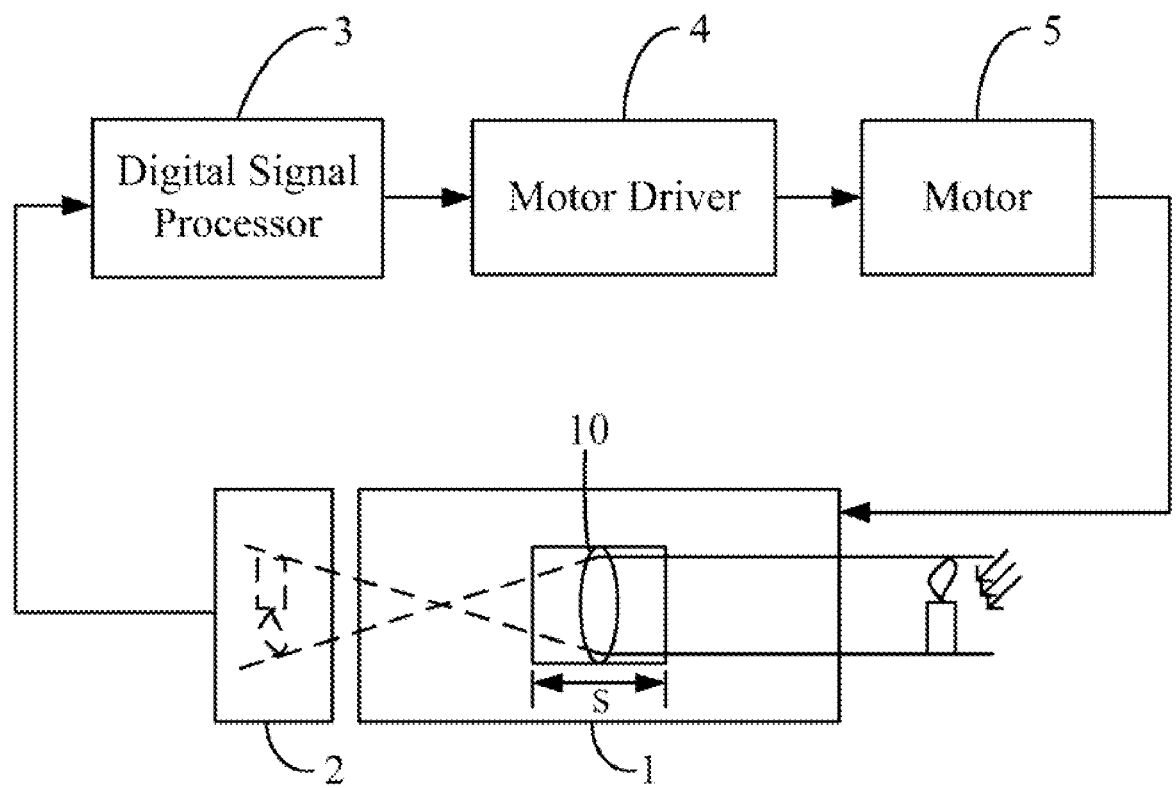
FIG. 1 is a schematic diagram illustrating hardware configuration of a focusing system for enhancing resolution of an optical system in accordance with one exemplary embodiment.

FIG. 1 is a schematic diagram illustrating hardware configuration of a focusing system for enhancing resolution of an optical system (hereinafter, "the focusing system") in accordance with an exemplary embodiment. The focusing system typically includes a lens assembly 1, an image sensor 2, a digital signal processor (DSP) 3, a motor driver 4, and a motor 5. The lens assembly 1 consists of a group of optical lenses, which includes an AF lens 10 connected to the motor 5. The AF lens 10 contains one or more optical lenses, and is configured for focusing on an object to obtain an image of the object. The image sensor 2 is configured for capturing the image, and transmitting the image to the DSP 3. The DSP 3, using a designated point within a motion range of the AF lens 10, calculates and determines a first coordinate and a second coordinate at which positions the AF lens 10 achieves modulation transfer functions (MTFs) performance objectives.

There are two MTFs at each point of the image: one along the sagittal direction and one in the meridional direction, at right angles to the sagittal direction. Because of this, the MTF of the image typically includes sagittal MTFs and meridional MTFs. The first coordinate corresponds to the point where the AF lens 10 would obtain a desired sagittal MTF. The second coordinate corresponds to the point where the AF lens 10 would obtain a desired meridional MTF.

The DSP 3 is further configured to ascertain a direction and distance of motion for positioning the AF lens 10 according to the two coordinates. The motor driver 4 is a driving circuit of the motor 5, which is configured to drive the motor 5 to position the AF lens 10 accordingly, thus obtaining an optimum focusing location.

In this embodiment, once the AF lens 10 has been in an optimum focusing location, the position of the lens assembly and other optical lenses in the lens assembly typically remains fixed.

Figure 2:
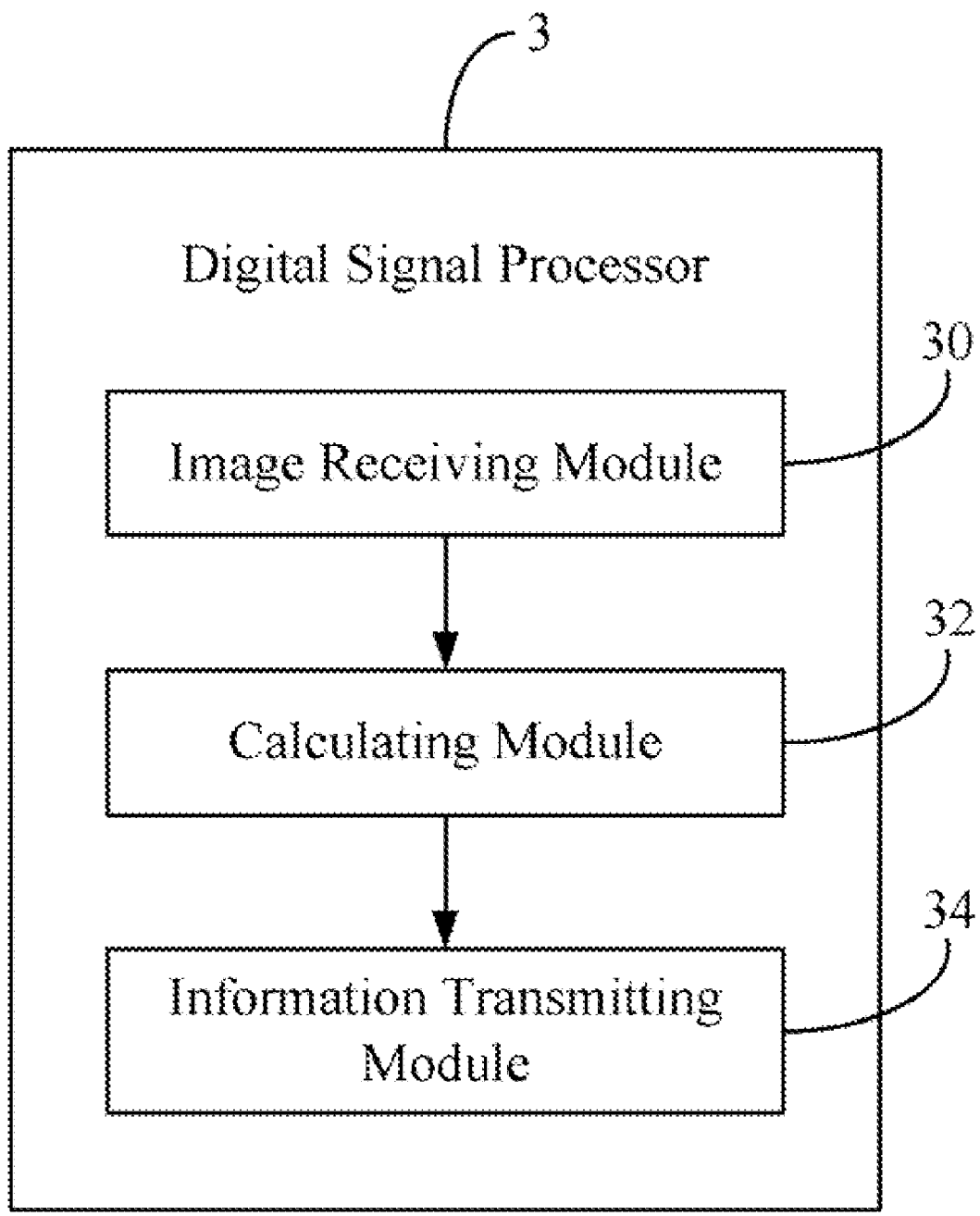
FIG. 2 is a block diagram of functional modules of the digital signal processor of FIG. 1.

FIG. 2 is a block diagram of functional modules of the DSP 3. The DSP 3 typically includes an image receiving module 30, a calculating module 32, and a data transmitting module 34.

The image receiving module 30 is configured for receiving the image captured by the image sensor 2, and transmitting the image to the calculating module 32. The calculating module 32 is configured for using the designated point within the motion range of the AF lens 10, to calculate the first coordinate and the second coordinate of the AF lens 10 according to the designated point, characteristics of the AF lens 10, and the resolution of the image. Wherein the first coordinate corresponds to the point where the AF lens 10 would obtain a desired sagittal MTF, and the second coordinate corresponds to the point where the AF lens 10 would obtain a desired meridional MTF. The calculating module 32 is further configured for ascertaining the direction and distance of motion for positioning the AF lens 10 according to the two coordinates.

Figure 3:
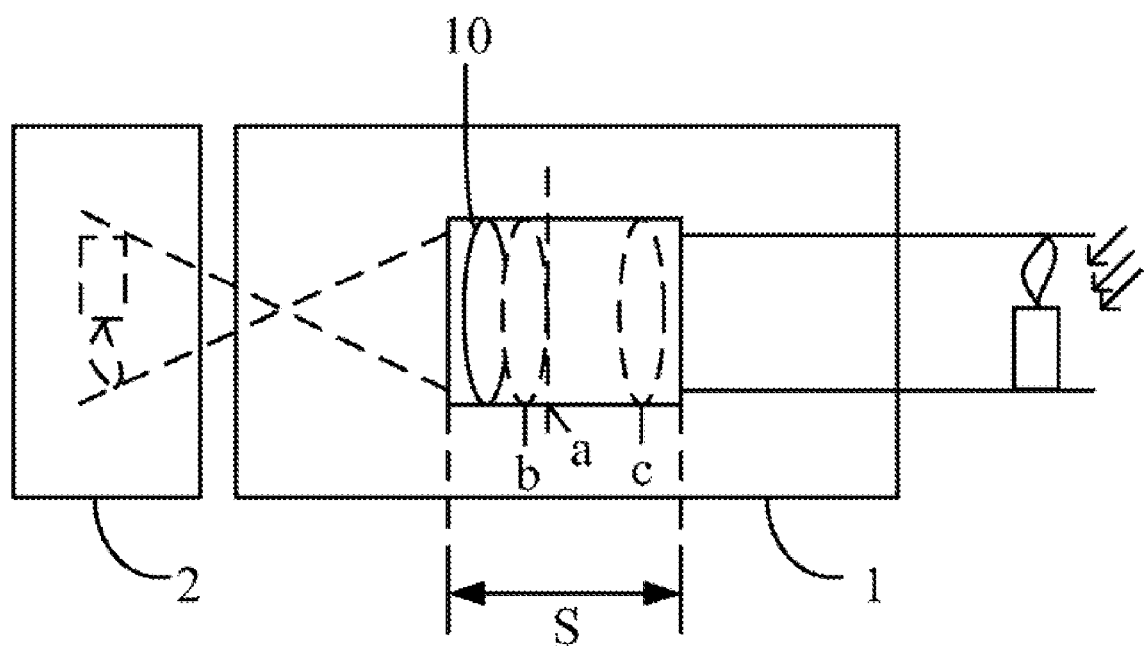
FIG. 3 is a schematic diagram illustrating an auto focusing (AF) lens moving in a lens assembly to determine a first coordinate and a second coordinate at which positions the AF lens achieves MTF performance objectives, according to an exemplary configuration of the embodiment.

Referring to FIG. 3, this embodiment uses a burning candle as an example object. The lens assembly 1 focuses an image of the burning candle onto the image sensor 3, which then transmits the image to the DSP 3. The calculating module 32 of the DSP 3 designates a point "a" within the motion range "S" of the AF lens 10, namely the AF lens 10 can perform a horizontal movement within the motion range "S." The designated point "a" is considered as the origin of coordinate.

After the motor driver 4 drives the motor 5 to move the AF lens 10 for three units, the calculating module 32 can obtain a distance between the AF lens 10 and the designated point "a," because each unit corresponds to a distance of motion. The calculating module 32 calculates and determines a first coordinate of the AF lens 10 at which point the AF lens 10 would obtain a desired sagittal MTF; then the calculating module 32 calculates a second coordinate of the AF lens 10 at which point the AF lens 10 would obtain a desired meridional MTF. For example, if the first coordinate equals "–0.01 millimeters at point "b" and the second coordinate equals 0.12 millimeters at point "c", the calculating module 32 obtains an analysis result that includes the direction and distance of motion for positioning the AF lens 10. In this embodiment, the analysis result indicates that the AF lens 10 can move between the points "b" and "c," namely between the first coordinate "–0.01 millimeters" and the second coordinate "0.12 millimeters."

The data transmission module 34 is configured for transmitting the analysis result to the motor driver 4.

Figure 4:
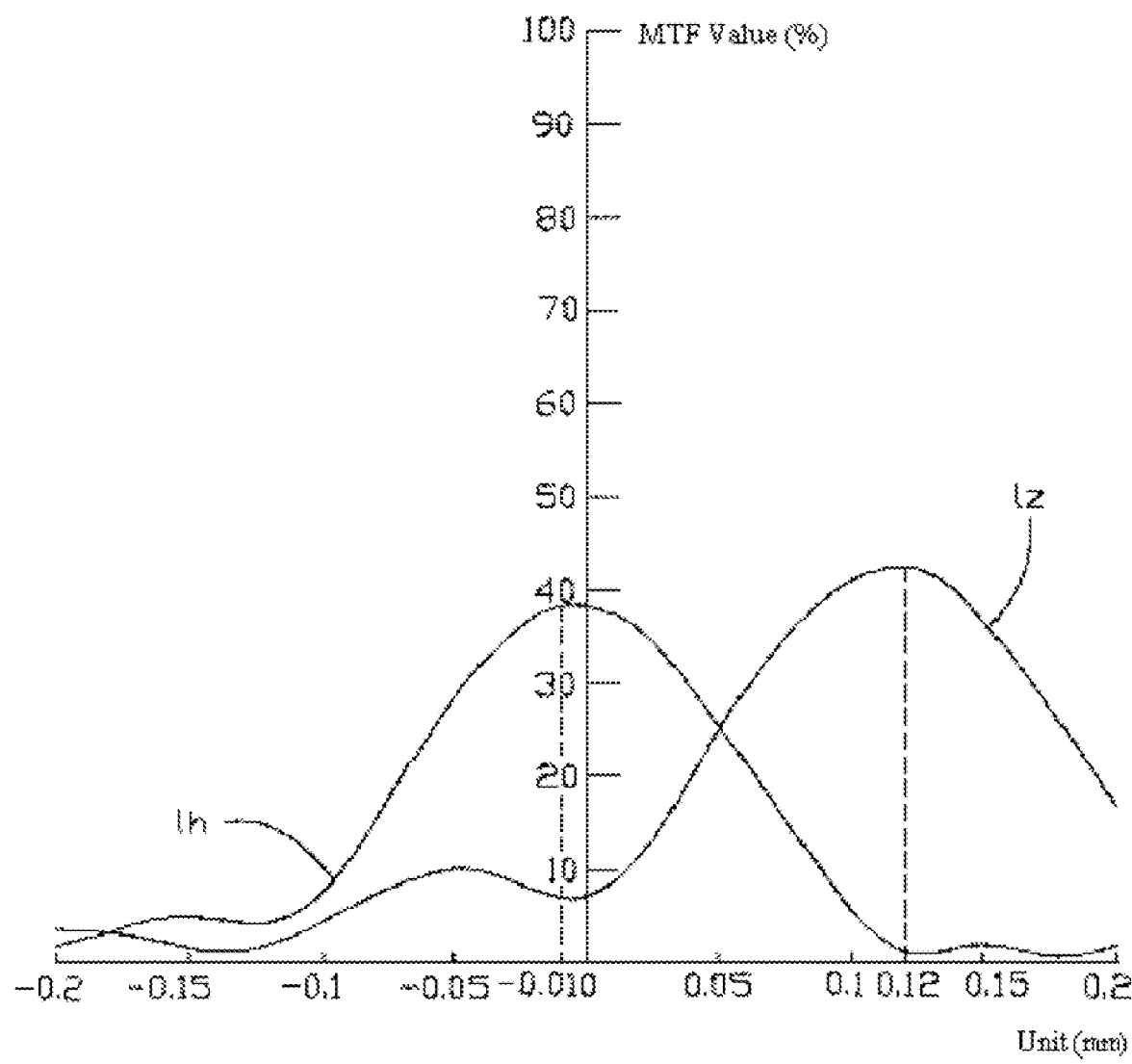
FIG. 4 is a graph illustrating changes in a sagittal MTF curve and a meridional MTF curve of the image corresponding to changes in position of the AF lens in the lens assembly.
Figure 5:
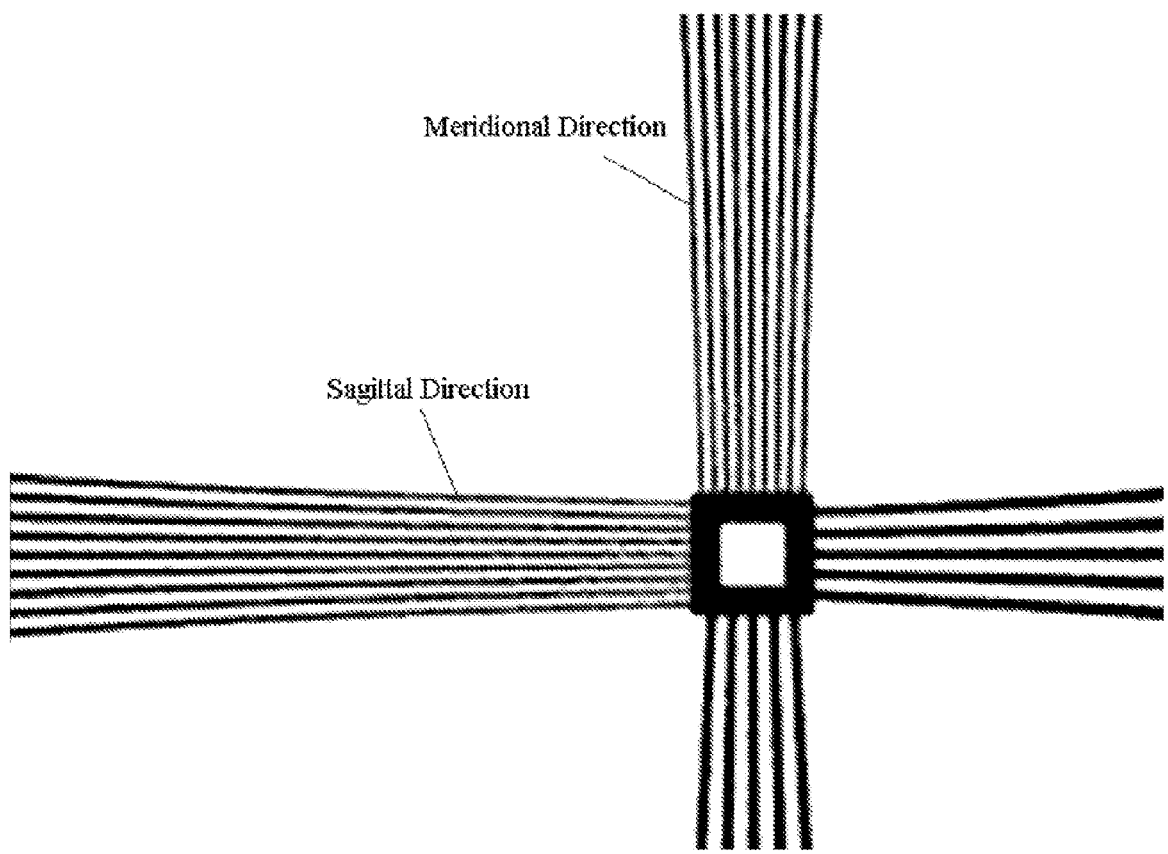
FIG. 5 is a schematic diagram of a preferable image that has a desired sagittal MTF and a desired meridional MTF.

FIG. 4 is a graph illustrating changes in a sagittal MTF curve and a meridional MTF curve of the image corresponding to changes in position of the AF lens 10 in the lens assembly 1. The origin of coordinate represents the designated point "a" in FIG. 3, the lateral axis represents the distance between the AF lens 10 and the designated point "a," the vertical axis represents MTF values, the line "1 h" represents the MTF value in the meridional MTF curve, and the line "1 z" represents the sagittal MTF curve. From the curve diagram, it is known that if the AF lens 10 is on the first coordinate "–0.01 millimeters," the MTF value of the line "1 h" is the desired meridional MTF; if the AF lens 10 is on the second coordinate "0.12 millimeters," the MTF value of the line "1 z" is the desired sagittal MTF. The first coordinate and the second coordinate define the range of motion allowed for the AF lens 10, within which a preferable resolution of the image can be obtained. FIG. 5 shows a schematic diagram of the preferable image that has the desired sagittal MTF and the desired meridional MTF.

Figure 6:
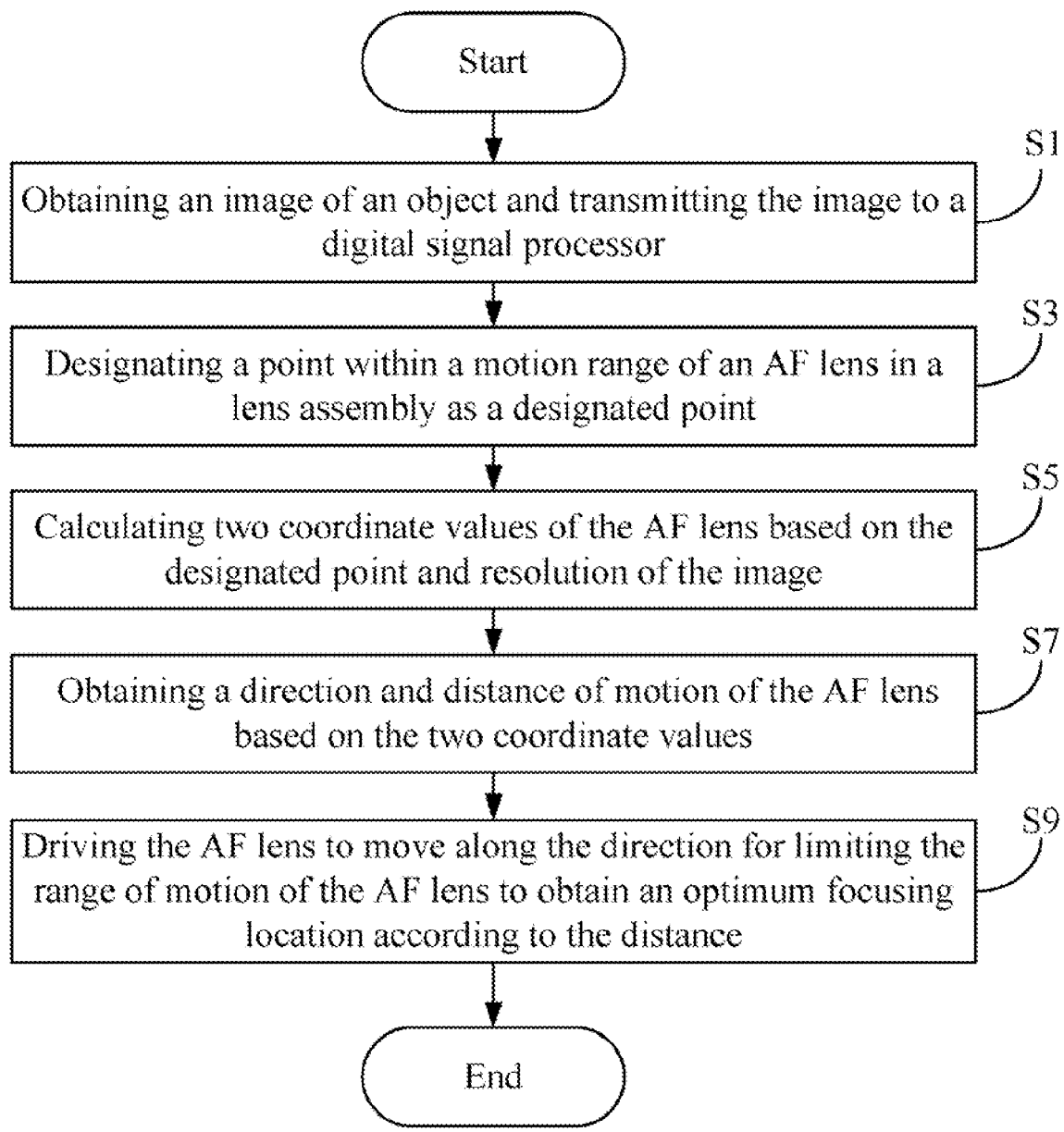
FIG. 6 is a flowchart of a focusing method for enhancing resolution of an optical system in accordance with another exemplary embodiment.

FIG. 6 is a flowchart of a focusing method for enhancing resolution of an optical system in accordance with another exemplary embodiment.

In step S1, the AF lens 10 focuses on the object and obtains the image of the object via the lens assembly 1 of the optical system, and the image sensor 2 captures the image and transmits the image to the DSP 3.

In step S3, the DSP 3 randomly designates a point within the motion range of the AF lens 10 (described as a designated point).

In step S5, the calculating module 32 calculates a first coordinate and a second coordinate for positioning the AF lens 10 according to the designated point and resolution of the image, namely, the calculating module 32 calculates the first coordinate of the AF lens 10 at which point the AF lens 10 would obtain a desired sagittal MTF, and calculates the second coordinate of the AF lens 10 at which point the AF lens 10 would obtain a desired meridional MTF.

In step S7, the calculating module 32 ascertains a direction and distance of motion for positioning the AF lens 10 according to the two coordinates.

In step S9, the data transmission module 34 transmits the direction and distance of motion to the motor driver 4, and the AF lens 10 is driven by the motor driver 4 to move along the direction and distance of motion, and limits the range of motion of the AF lens 10 to obtain an optimum focusing location to focus on the object according to the motion distance.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A focusing system for enhancing resolution of an optical system, the focusing system comprising:
    a lens assembly comprising an auto focusing (AF) lens configured for focusing on an object to obtain an image of the object;
    a digital signal processor comprising a calculating module configured for using a designated point within a motion range of the AF lens to calculate and determine a first coordinate of the AF lens at which point the AF lens obtains a desired sagittal modulation transfer function (MTF) and a second coordinate of the AF lens at which point the AF lens obtains a desired meridional MTF according to resolution of the image, and for ascertaining a direction and distance of motion for positioning the AF lens according to the two coordinates; and
    a motor driver connected with a motor, and configured for driving the motor to control the AF lens to move along the direction of motion and for limiting the range of motion of the AF lens to obtain an optimum focusing location to focus on the object according to the distance of motion.

2. The system as described in claim 1, further comprising an image sensor configured for capturing the image.

3. The system as described in claim 2, wherein the digital signal processor comprises an image receiving module configured for receiving the image captured by the image sensor.

4. The system as described in claim 1, wherein the digital signal processor comprises a data transmitting module configured for transmitting the direction and distance of motion for positioning the AF lens to the motor driver.

5. The system as described in claim 1, wherein positions of the lens assembly and optical lenses in the lens assembly remain fixed upon a condition that the AF lens has been in the optimum focusing location.

6. A focusing method for enhancing resolution of an optical system, the method comprising:
    focusing on an object and obtaining an image of the object by a lens assembly of the optical system;
    capturing the image and transmitting the image to a digital signal processor;
    designating a point within a motion range of an auto focusing (AF) lens in the lens assembly as a designated point;
    calculating and determining a first coordinate at which point the AF lens obtains a desired sagittal modulation transfer function (MTF), and calculating and determining a second coordinate at which point the AF lens obtains a desired meridional MTF;
    obtaining a direction and distance of motion for positioning the AF lens according to the two coordinates;
    driving the AF lens to move along the direction of motion; and
    limiting the range of motion of the AF lens to obtain an optimum focusing location to focus on the object according to the distance of motion.

7. The focusing method as described in claim 6, wherein the optimum focusing location is between the first coordinate and the second coordinate.

8. The focusing method as described in claim 6, wherein positions of the lens assembly and optical lenses in the lens assembly remain fixed upon a condition that the AF lens has been in the optimum focusing location.

9. A focusing method for enhancing resolution of an optical system, the method comprising:

focusing on an object and obtaining an image of the object by a lens assembly of the optical system;

using a designated point within a motion range of an auto focusing (AF) lens in the lens assembly to calculate and determine a first coordinate of the AF lens at which point the AF lens obtains a desired sagittal modulation transfer function (MTF) and a second coordinate of the AF lens at which point the AF lens obtains a desired meridional MTF according to resolution of the image;

obtaining a direction and distance for positioning the AF lens according to the two coordinates;

driving the AF lens to move along the direction of motion; and limiting the range of motion of the AF lens to obtain an optimum focusing location to focus on the object according to the distance of motion.

10. The focusing method as described in claim 9, further comprising a step of capturing the image and transmitting the image to a digital signal processor.

11. The focusing method as described in claim 9, wherein positions of the lens assembly and optical lenses in the lens assembly remain fixed upon a condition that the AF lens has been in the optimum focusing location.

* * * * *